United States Patent
Malsbury

(10) Patent No.: US 7,247,220 B2
(45) Date of Patent: Jul. 24, 2007

(54) COKE DRUM DISCHARGE SYSTEM

(75) Inventor: Allen S. Malsbury, Parsippany, NJ (US)

(73) Assignee: Foster Wheeler USA Corporation, Clinton, NJ (US)

( * ) Notice: Subject to any disclaimer, the term of this patent is extended or adjusted under 35 U.S.C. 154(b) by 306 days.

(21) Appl. No.: 10/160,523

(22) Filed: May 31, 2002

(65) Prior Publication Data

US 2003/0089589 A1 May 15, 2003

Related U.S. Application Data

(60) Provisional application No. 60/331,156, filed on Nov. 9, 2001.

(51) Int. Cl.
*C10B 25/00* (2006.01)
*C10B 35/00* (2006.01)
*C10B 27/00* (2006.01)

(52) U.S. Cl. ............... 202/242; 202/252; 202/254; 202/262

(58) Field of Classification Search ............. 202/242, 202/252, 254, 258, 262; 137/329.1, 329.2, 137/329.3
See application file for complete search history.

(56) References Cited

U.S. PATENT DOCUMENTS

| 2,317,566 | A | * | 4/1943 | Utterback | 202/96 |
|---|---|---|---|---|---|
| 2,318,131 | A | | 5/1943 | Utterback | 202/36 |
| 2,702,269 | A | | 2/1955 | Geller | 202/121 |
| 3,617,480 | A | | 11/1971 | Keel | 208/50 |
| 3,852,047 | A | | 12/1974 | Schlinger et al. | 44/24 |
| 4,359,364 | A | * | 11/1982 | Gregor et al. | 202/230 |
| 4,612,109 | A | | 9/1986 | Dillon et al. | 208/131 |
| 4,666,585 | A | | 5/1987 | Figgins et al. | 208/131 |
| 4,758,329 | A | | 7/1988 | Newman et al. | 208/131 |
| 4,828,682 | A | | 5/1989 | Noguchi et al. | 208/131 |
| 4,874,505 | A | | 10/1989 | Bartilucci et al. | 208/131 |
| 4,994,169 | A | | 2/1991 | Godino et al. | 208/50 |
| 5,098,524 | A | | 3/1992 | Antalfy et al. | 202/96 |
| 5,116,022 | A | * | 5/1992 | Genreith et al. | 251/175 |
| 5,417,811 | A | * | 5/1995 | Malsbury | 202/241 |
| 6,223,925 | B1 | | 5/2001 | Malsbury et al. | 220/328 |
| 6,989,081 | B2 | * | 1/2006 | Lah | 202/245 |
| 2003/0183500 | A1 | * | 10/2003 | Antalffy et al. | 202/244 |

FOREIGN PATENT DOCUMENTS

DE 258245 7/1988

OTHER PUBLICATIONS

Ellis, Paul J. and C.A. Paul, "Tutorial: Delayed Coking Fundamentals." AIChE 1998 Spring National Meeting, Mar. 9, 1998, Great Lakes Carbon Corporation, Port Arthur, TX.

* cited by examiner

*Primary Examiner*—N. Bhat
(74) *Attorney, Agent, or Firm*—Fitzpatrick, Cella, Harper & Scinto

(57) ABSTRACT

An apparatus including a coke drum for coking hydrocarbon substances, a valve disposed near the bottom of the coke drum, and a discharge conduit for removing coke from the coke drum, wherein the discharge conduit is connected to the valve such that when the valve is open, the coke may be removed via the discharge conduit.

22 Claims, 1 Drawing Sheet

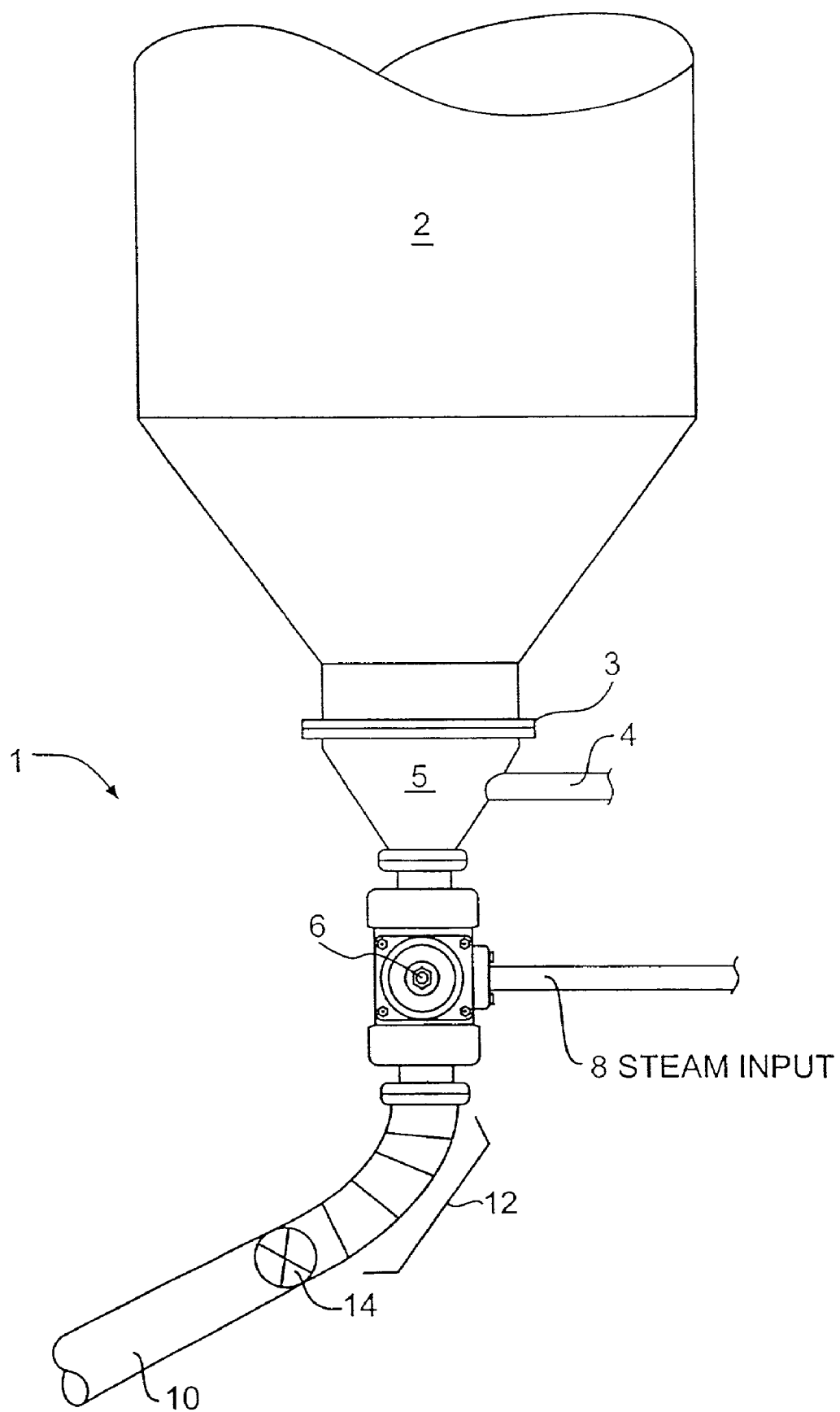

COKE DRUM DISCHARGE SYSTEM

This application claims benefit of provisional application No. 60/331,156, filed Nov. 9, 2001.

BACKGROUND OF THE INVENTION

1. Field of the Invention

This invention relates to a coke drum, and more particularly, to a discharge system for a coke drum.

2. Background of the Invention

In a conventional delayed coking process, petroleum residues are fed at elevated temperatures to a large steel vessel called a coke drum, where the residues are thermally cracked and formed into coke. When the coke drum has filled with coke, the drum is injected with steam and cooled with water. Subsequently, top and bottom covers of the drum are removed in a process called unheading. Despite the open bottom of the drum, however, the coke often remains inside the drum until it is cut. When cut, the coke falls out of the open bottom of the drum down a chute or other conduit, so that it may be transported and further processed.

As discussed above, the conventional coking process requires unheading the coke drum. Since the coke drum must contain a severe atmosphere of elevated temperatures, the bottom cover is typically secured to the coke drum by dozens of bolts, which often must be loosened manually. As a result, unheading is typically a labor intensive chore.

A further drawback of the conventional unheading process is that it is difficult to use in the production of shot coke. Shot coke is unique because it will not always remain in the drum during and after unheading. As a result, the coke will often pour out of the drum as the bottom cover is being removed. In addition, the shot coke may rest on the bottom cover, putting a large load on the bottom cover and making its controlled removal difficult.

Examples of apparatuses designed to mitigate the difficulties of unheading the coke drum are shown in U.S. Pat. No. 2,318,131 to Utterback and U.S. Pat. No. 2,702,269 to Geller. Both Utterback and Geller disclose continuous processes that do not require unheading.

Utterback shows a spray coking process, in which spray-coked material is formed in chamber 1 and falls through a duct 2 into a vessel 3, which contains oil. The solid, spray-coked material is suspended in the oil, and the resultant mixture is pumped by a pump 6 into separators 8 and 9, where screens collect the coke. Oil is pressured out of the separators 8 and 9, and the collected coke is partially dried using steam. The coke then is removed through discharge piping 24, which is shown to contain a valve. The oil is returned to the vessel 3 via valved piping 11 or to an upstream tank 16 via valved piping 23.

Although Utterback mitigates the unheading problem, it also suffers from drawbacks. For example, rather than producing ready-to-transport coke out of the coke drum 1, Utterback requires additional components (such as a vessel full of oil, a pump and separators) to process the coke and get it ready for transport. In contrast, a batch process produces coke that is ready for transport directly out of the coke drum.

Geller also discloses a continuous coking process. In Geller, feed material for coking is routed through pipe 2 into a coking space 1 via a nozzle 3 directed vertically upwards. A casing 8 and lining 9 surround the coking space 1 for indirect heating. The coke falls onto an outlet branch 21 and is discharged from the bottom of the vessel using a worm 22, which is self-sealing against the passage of gas.

Although Geller's continuous process does not require unheading, it does suffer from at least two drawbacks. First, the coke leaving the drum is at a high enough temperature that it may combust if it comes into contact with air, so additional components are required to cool the coke in an oxygen-depleted environment. Second, the coke drum needs an outer casing to heat its walls, implicating increased cost for installation and manufacture.

As the drawbacks of Utterback and Geller indicate, the continuous process for producing coke is not always desirable. Therefore, there is a need for an apparatus to discharge coke from a coke drum in batches, but without the drawback in conventional batch cokers of having to unhead the coke drum each time coke is removed.

SUMMARY OF THE INVENTION

This invention addresses the foregoing needs in the art by providing a discharge conduit on a coke drum, the discharge conduit having a ball valve. According to a preferred embodiment, cut coke can be removed from the coke drum past the opened ball valve down the discharge conduit, and a bottom cover of the coke drum does not need to be unheaded.

In one aspect of the invention, an apparatus includes a coke drum for coking, a valve disposed near the bottom of the coke drum, and a discharge conduit for removing coke from the coke drum. The discharge conduit is connected to the valve such that when the valve is open, the coke can be removed via the discharge conduit.

In another aspect the apparatus includes another valve disposed beneath the valve, such that if the valve leaks, the other valve contains the contents of the coke drum.

In yet another aspect of the invention, a steam supply is connected to the valve at a higher pressure than exists upstream of the valve.

In another aspect of the invention, the apparatus includes a side conduit for feeding or draining the coke drum. Accordingly, when the valve is closed, charge can be fed and water drained from the side conduit.

In another aspect of the invention, the discharge conduit is coupled to the valve which is coupled to the coke drum, such that no gap is formed between the bottom of the coke drum and a proximal end of the discharge conduit.

In another aspect of the invention, a closed coke drum discharge system for removing coke from a coke drum includes a discharge conduit disposed beneath the coke drum, and a ball valve interconnecting the discharge conduit and the coke drum. The coke exiting the coke drum is enclosed until exiting the discharge conduit.

In yet another aspect of the invention, a discharge system for a coke drum includes a coke drum, a side conduit for feeding petroleum to the coke drum, guiding means for guiding coke from the coke drum, and sealing means for sealing coke in the coke drum.

BRIEF DESCRIPTION OF THE DRAWING

The FIGURE is a side view of a preferred embodiment of a discharge system for a coke drum.

The FIGURE is a side view of a preferred embodiment of a discharge system for a coke drum.

DETAILED DESCRIPTION OF THE PREFERRED EMBODIMENT

The FIGURE shows a discharge system 1 for a coke drum 2 which reduces the frequency with which a bottom flange 3 of the coke drum 2 needs to be unheaded. The discharge system 1 generally includes a ball valve 6 and a discharge conduit 10.

The discharge system 1 may be used to coke hydrocarbon substances such as petroleum, for example. Included in the system is a side conduit 4 for draining water from the coke drum 2, supplying steam or feeding a petroleum charge. The side conduit 4 is preferably connected to a funnel 5, which itself is connected to the bottom of the coke drum 2. The funnel 5 may be permanently attached to the coke drum 2, bolted on, or removably attached by hydraulic means as disclosed in U.S. Pat. No. 6,223,925 to Malsbury, for example.

Below the side conduit 4 and funnel 5 is a ball valve 6, preferably having a steam supply 8 connected to it. The ball valve 6 is preferably a conventional, double-seat, full-port ball valve. Although a ball valve is illustrated, other types of valves may be used without departing from the scope of the invention.

The steam supply 8 connected to the ball valve 6 preferably supplies steam at a higher pressure than that found upstream of the ball valve 6, so that if the ball valve 6 seat leaks, it will fail safe. In this way, steam will be injected into the coke drum 2 should the ball valve 6 leak, and the high-pressure contents of the coke drum 2 will not be jetted into the environment. An arrangement for providing a steam supply to a ball valve is shown in U.S. Pat. No. 5,417,811 to Malsbury, incorporated herein by reference.

Beneath the ball valve 6 is a discharge conduit 10, preferably having a mitered section 12. Of course, one of ordinary skill understands that while no mitered section is necessary, it may be convenient depending on the location of the coke drum 2 and the discharge cart (not shown), which collects the coke and transports it. Regardless, the discharge conduit 10 may be an open chute, large-diameter pipe or any other conduit suitable for conveying coke. Preferably, the discharge conduit 10 is the large-diameter pipe.

The mitered section 12 is preferably overlaid, as is known in the art, with a welding material. The overlay resists erosion at the bend and adds life to the discharge conduit 10.

As can be seen in the drawing, there is no gap from the bottom of the coke drum 2 to the proximal end of the discharge conduit 10. This arrangement allows the discharge system 1 to be used in the production of shot coke, for example, as there is no danger that the coke might pour out of a partially open cover. Of course, a gap may be formed in the discharge system 1 if it is convenient, but unlike conventional systems (where a gap is necessary to permit unheading), it is not necessary.

The discharge system 1 preferably includes a second valve 14. The second valve 14 contains the contents of the coke drum 2 if the ball valve 6 should fail. The second valve 14 may be of any suitable construction, including a gate valve, a slide gate or an auto-blinding station.

The operation of the ball valve 6 and second valve 14 may be automated. Included in the automation control is an interlock which prevents inadvertent opening or closing of the ball valve 6 or the second valve 14.

A possible operation of the coke discharge system 1 is as follows. While the ball valve 6 is closed, the coke drum 2 is fed with charge, such as petroleum, through side conduit 4. When the coke drum 2 is full, charging is stopped and steam is injected via side conduit 4 in order to remove valuable vapors from the coke drum 2. Once the vapors have been removed, water is introduced to the coke drum 2 through the side conduit 4 in a quenching step until the water has reached to the top of the coke drum 2. Subsequently, the ball valve 6 and second valve 14 (if present) are opened, draining the quench water, and the coke in the coke drum 2 is cut with a high-pressure water cutter, such as the type disclosed in U.S. Pat. No. 5,417,811 to Malsbury. The cut coke falls off the interior walls of the coke drum 2, and the coke and water from the cutter fall through the funnel 5 and out the discharge conduit 10. From there the coke is collected and transported.

As is apparent from the above disclosure, the present invention has the advantage of not requiring unheading every time coke is removed from the drum. Instead, a single ball valve is opened, allowing the coke to fall down the discharge conduit. In addition, the apparatus may be constructed without a gap between the bottom of the coke drum and the discharge conduit. Such an arrangement allows the apparatus to be used in the production of shot coke.

While the present invention has been described with respect to what is at present considered to be the preferred embodiments, it should be understood that the invention is not limited to the disclosed embodiments. To the contrary, as exemplified above, the invention is intended to cover various modifications and equivalent arrangements included within the spirit and scope of the appended claims. Therefore, the scope of the following claims is intended to be accorded the broadest reasonable interpretation so as to encompass all such modifications and equivalent structures and functions.

What is claimed is:

1. An apparatus comprising:
    a coke drum for coking hydrocarbon substances, the coke drum having a bottom flange;
    a funnel removably attached to said bottom flange;
    a valve connected to said funnel, said valve being actuatable between an open position and a closed position;
    a steam supply providing a source of steam at a higher pressure than a pressure applied to said valve from contents of said coke drum located upstream of said valve, said steam supply supplying the steam at the higher pressure to said valve such that if said valve leaks, said steam supply causes said valve to fail safe; and
    a discharge conduit disposed downstream of said valve for removing coke from said coke drum when said valve is in the open position.

2. An apparatus according to claim 1, wherein said discharge conduit comprises a mitered bend.

3. An apparatus according to claim 2, wherein said mitered section is overlaid.

4. An apparatus according to claim 1, further comprising another valve, which is disposed beneath said valve, such that if said valve leaks, said other valve contains the contents of said coke drum.

5. An apparatus according to claim 1, wherein said discharge conduit is a pipe.

6. An apparatus according to claim 1, wherein said discharge conduit is a chute with an open top.

7. An apparatus according to claim 1, further comprising:
    a side conduit for feeding or draining said coke drum,
    said apparatus being adapted such that when said valve is closed, the hydrocarbon substance can be fed from said side conduit.

8. An apparatus according to claim 1, wherein said discharge conduit is coupled to said valve which is coupled to said coke drum, such that no gap is formed between the bottom of said coke drum and a proximal end of said discharge conduit.

9. An apparatus according to claim 1, wherein said valve is a ball valve.

10. An apparatus according to claim 7, wherein said side conduit is connected to said funnel.

11. A closed system for discharging coke from a coke drum, said system comprising:
a coke drum having a bottom flange;
a funnel removably attached to said bottom flange;
a ball valve connected to said funnel, said valve being actuatable between an open position and a closed position;
a discharge conduit disposed beneath the ball valve; and
a steam supply providing a source of steam at a higher pressure than a pressure applied to said ball valve from contents of said coke drum located upstream of said ball valve, said steam supply supplying the steam at the higher pressure to said ball valve such that if said ball valve leaks, said steam supply causes said ball valve to fail safe,
wherein coke exiting the coke drum is enclosed until exiting said discharge conduit.

12. A discharge system for a coke drum, said system comprising:
a coke drum having a bottom flange;
a funnel removably attached to said bottom flange;
a side conduit for feeding petroleum to said coke drum;
guiding means for guiding coke from a bottom of said coke drum;
sealing means, disposed downstream of said funnel and upstream of said guiding means, for sealing coke in said coke drum; and
steam supplying means providing a source of steam at a higher pressure than a pressure applied to said sealing means from contents of said coke drum located upstream of said sealing means, said steam supplying means supplying the steam at the higher pressure to said sealing means such that if said sealing means leaks, said steam supplying means causes said sealing means to fail safe.

13. A discharge system according to claim 12, wherein said guiding means includes a pipe.

14. A discharge system according to claim 12, wherein said guiding means includes a pipe and a mitered bend.

15. A discharge system according to claim 12, wherein said sealing means comprises a ball valve.

16. A discharge system according to claim 12, wherein said side conduit is connected to said funnel.

17. An apparatus comprising:
a coke drum for coking hydrocarbon substances, the coke drum having a bottom flange;
a side conduit connected to a lower portion of said coke drum for feeding and draining said coke drum;
a funnel removably attached to said bottom flange;
a valve connected to said funnel, said valve being actuatable between an open position and a closed position;
a steam supply providing a source of steam at a higher pressure than a pressure applied to said valve from contents of said coke drum located upstream of said valve, said steam supply supplying the steam at the higher pressure to said valve such that if said valve leaks, said steam supply causes said valve to fail safe; and
a discharge conduit disposed downstream of said valve for removing coke from said coke drum when said valve is in the open position,
wherein said coke drum is filled with the hydrocarbon substances via said side conduit before coking.

18. The apparatus according to claim 17, wherein the hydrocarbon substances are coked in said coke drum by: (i) filling, via said side conduit, the coke drum with the hydrocarbon substances while said valve is closed, (ii) quenching the hydrocarbon substances using a quenching medium, supplied via said side conduit, and (iii) draining the quenching medium from said coke drum via said side conduit, and wherein said valve is subsequently opened and the formed coke is cut for removal from said coke drum via said discharge conduit.

19. An apparatus according to claim 17, further comprising a steam supply conduit connected to said valve, wherein said steam supply conduit supplies steam to said valve at a higher pressure than that upstream of said valve, such that, if said valve leaks, the steam supply will cause said valve to fail safe.

20. An apparatus according to claim 17, wherein said discharge conduit is coupled to said valve which is coupled to said coke drum, such that no gap is formed between the bottom of said coke drum and a proximal end of said discharge conduit.

21. An apparatus according to claim 17, wherein said valve is a ball valve.

22. An apparatus according to claim 17, wherein said side conduit is connected to said funnel.

* * * * *